May 6, 1952 H. A. STICKEL 2,595,614

SELECTIVE SIGNAL RECEIVING DEVICE

Filed April 8, 1949 5 Sheets-Sheet 1

INVENTOR.
HAROLD A. STICKEL
BY Oswald H. Milmore
His Attorney

SELECTIVE SIGNAL RECEIVING DEVICE
Filed April 8, 1949 5 Sheets-Sheet 2
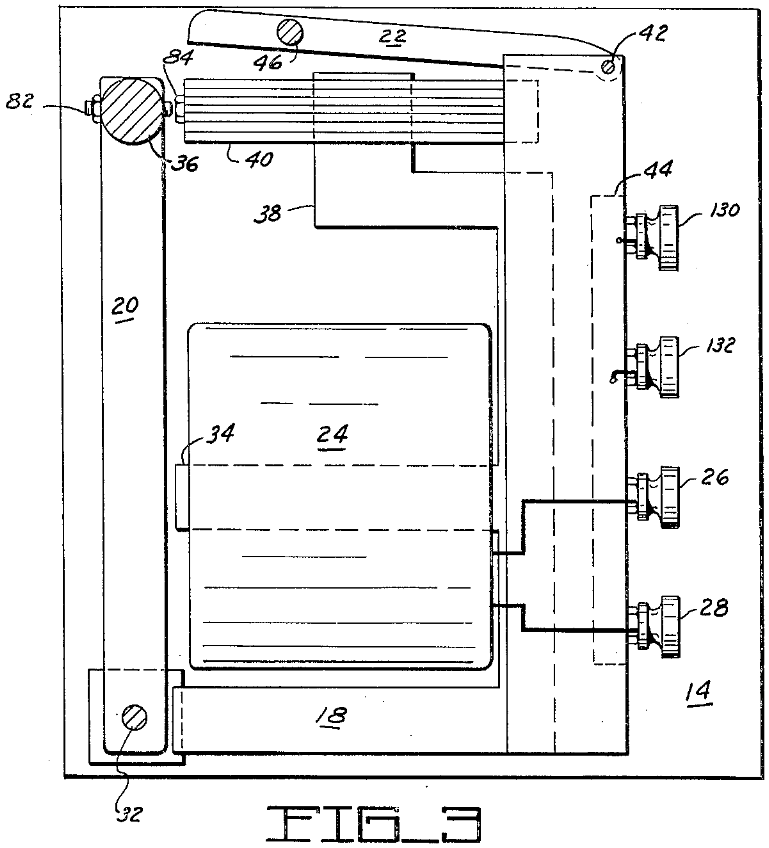
FIG. 3
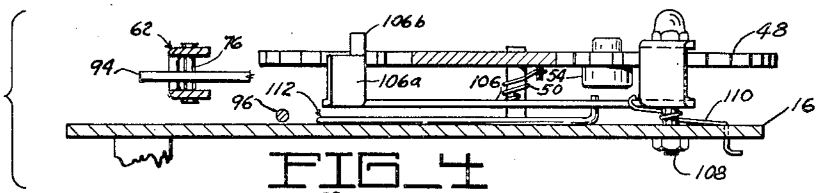
FIG. 4
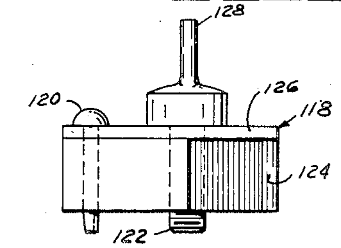
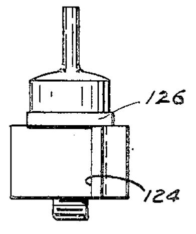
FIG. 5 FIG. 6
INVENTOR.
HAROLD A. STICKEL
BY Oswald H. Milmore
His Attorney May 6, 1952 H. A. STICKEL 2,595,614

SELECTIVE SIGNAL RECEIVING DEVICE

Filed April 8, 1949 5 Sheets-Sheet 3

INVENTOR.
HAROLD A. STICKEL
BY Oswald H. Milmore
His Attorney

SELECTIVE SIGNAL RECEIVING DEVICE

INVENTOR.
HAROLD A. STICKEL
BY Oswald H. Milmore
His Attorney

May 6, 1952 H. A. STICKEL 2,595,614

SELECTIVE SIGNAL RECEIVING DEVICE

Filed April 8, 1949 5 Sheets-Sheet 5

INVENTOR.
HAROLD A. STICKEL
BY Oswald H. Milmore
His Attorney

Patented May 6, 1952 2,595,614

UNITED STATES PATENT OFFICE 2,595,614

SELECTIVE SIGNAL RECEIVING DEVICE

Harold Adolph Stickel, San Francisco, Calif.

Application April 8, 1949, Serial No. 86,250

33 Claims. (Cl. 177—353)

This invention relates to selective signal receiving devices of the type operated by electrical signals in the form of digits. It is particularly applicable for conditioning a control element, such as an operating element of an electrical switch or a mechanism, at a remote station to energize a visual or aural signal or to perform some function upon the reception of a predetermined code in the form of one or more integers, e. g., in multi-party telephone systems, in radio networks wherein one or several selected receiving stations tuned to a common frequency is to be called, or for remote control of various mechanisms.

Signals in the form of integers may be transmitted over either a "closed type" circuit or "open type" circuits; in the former case the circuit is energized prior to the transmission of the signal (either immediately prior thereto or continuously) and also between successive integer signals, which, in combination, constitute a code group, and the integer signal or signals is/are transmitted by opening the circuit in rapid succession for a number of times dependent upon the integer to be transmitted, e. g., equal to such integer, or to a multiple thereof, or to the integer plus a constant, etc., the integer zero being transmitted as a definite number of interruptions different from that for any other integer; in the latter case, the circuit is de-energized prior to the transmission of an integer signal and also between successive integer signals, and each integer signal is transmitted by applying a succession of electric impulses to the circuit, numbered as stated above. Closed type circuits are commonly used in telephone practice, e. g., in dial telephone equipment, while open type circuits are more common in devices receiving the signals through a radio receiver. In the latter case the impulses are often transmitted by modulating a carrier wave of radio frequency, although continuous waves can be used.

This invention is applicable both to closed type and open type circuits, and the term "integer signal" is used herein to denote a signal made up of a sequence of short, rapidly recurring current interruptions or current impulses (e. g., recurring with a frequency of the order of ten per second) and of a number determined by the integer, which integer may have any desired value, e. g., from zero up to twenty or more. When ten or less interruptions or impulses are used such signals are sometimes known as digit type signals.

Selective signal receiving devices of the type responding to integer type signals now available are complex and not well suited for use at remote stations, such as subscribers' telephone stations and radio receiving stations, and it is a primary object of the invention to provide a simple device which will reliably respond to a predetermined code comprising one or more signals of the integer type. A further object is to provide a device which is reliable in its operation and will operate and maintain its movable control element in its advanced operating position despite shocks, vibrations, etc., such as would occur in radio-equipped vehicles.

The permutations of integers up to even comparatively low upper limits, taken a small number of times at a time, e. g., two or three, is large enough to afford a great many different codes. For example, if a code consists of three integers not greater than twenty, 9,261 different codes are possible. However, in the prior receiving instruments only a limited number of these different codes could be usefully employed because the mechanisms in the selector were such that many codes would cause more than one receiver to respond although such receivers were set to different codes. It is, therefore, another primary object of the invention to provide an electric selective signal receiving device which may be adapted to either the closed type circuit or the open type circuit for conditioning a control element at a remote station only upon the reception at such station of a predetermined code comprising two or more integer signals, wherein the possibility of having two or more stations respond to the same code is obviated. It thereby becomes possible to utilize all of the possible combinations of integers, and a greater number of remote stations may be linked either by a metallic circuit or by radio and assigned different predetermined codes. Ancillary thereto, it is an object to provide a device of the type described which may, nevertheless, be modified to permit all or a preselected group of stations to respond to the same common integer signal without adversely impairing the selectivity above noted beyond rendering the common integer signal unavailable as the first integer of an individual code.

A further object is to provide a selective signal receiving device of the type described which is suitable for use in a system wherein each remote station can transmit a calling signal in the form of integers for selective response by any desired one of several other stations in the net.

A specific object is to provide a selective signal receiving device having a code plate associated with a reciprocable propelling member movable in response to individual current interruptions or current impulses constituting an integer signal and arranged to move the plate by such reciprocations, and blocking means for rendeering additional reciprocations of the member ineffective to cause further movement of the plate when the number of reciprocations exceeds a predetermined number, viz., when the plate has been moved to a predetermined position.

A further specific object is to provide a selective signal receiving device having a reciprocable propelling pawl movable in response to individual current interruptions or current impulses constituting an integer signal and arranged to advance a code plate step-by-step, together with means for controlling or limiting the length of the propelling stroke of the pawl in accordance with the order of the stroke within a group of strokes of a single integer signal, and with blocking means for preventing propelling strokes from being effective to cause further movement of the plate when the plate is in a predetermined position at the beginning of a propelling stroke.

Still another specific object is to provide a selective signal receiving device having a code plate biased for movement toward an initial or normal position and associated with propelling means adapted to advance the plate from said starting or normal position in response to electric signals of the integer type and for distances dependent upon the integer and retaining means, such as a retaining pawl engageable with the plate, arranged to secure the plate against retrograde movement upon the completion of the signal, the retaining means being operable only when the plate was advanced during the operation of the propelling means to a predetermined position. It should be noted that this predetermined position (herein denoted by the letter "A"), is different from the predetermined position referred to in the two preceding paragraphs (herein denoted by the letter "B").

Briefly, the complete electric selective signal device according to the invention has a control element or code plate mounted for movement in an advancing direction; propelling means for advancing the plate step-by-step with the elements of an electric integer signal in a manner that the steps corresponding to the elements of the signal are of unequal lengths, e. g., such that the first step associated with any integral signal is longer than the subsequent steps; and means dependent upon the number and lengths of the steps for returning the plate to its normal position, e. g., by retrograde movement, upon the cessation of the integer signal when the signal was different from a predetermined signal. The last named means positively prevents a response of the device to any signal other than the predetermined one, and takes care of two situations, viz., reception of a signal greater than the predetermined one, and the reception of one smaller than the predetermined signal. The subcombinations of elements for coping with these two types of erroneous signals are considered separately hereafter. The control element or plate is adapted to exercise some control function, as by carrying an operating member, such as a cap or actuating lever or a contact of an electric switch.

While such a device can be used for reception of codes consisting of single integer signals, the advantages thereof assume particular significance when employed for reception of codes consisting of two or more integer signals in view of the greater number of alternate codes possible and because it affords the opportunity of maximum utilization of the mathematically possible permutations of different codes.

Considering the subcombination features, according to one important feature, particularly useful for preventing "overriding" of the code plate or control element when two great an integer signal is received, the control element, which may be in the form of a toothed wheel or of any object adapted for rotary or translatory motion, is provided with any suitable propelling means causing the control element to advance in successive steps, step-by-step with the elements of the integer signal, and means are provided for controlling the lengths of the steps within any group of steps associated with the same integer signal in accordance with the order of step within the group. For example, the first step of the control element occurring with each integer signal may be longer, e. g., twice or two and one half or three times as long as the subsequent steps. Blocking means are provided for rendering the propelling means ineffective to advance the control element from certain predetermined positions "B" of the control element, but permitting such "B" positions to be by-passed by a long step which carries the control element past such position. According to a preferred embodiment, the propelling means is in the form of a reciprocable propelling pawl cooperating with spaced teeth, serrations or notches in a code plate and movable in step with the elements of the electric integer signal, the propelling pawl being arranged so that the first propelling stroke of the pawl is equal to two tooth intervals and subsequent propelling strokes, if any, of the same integer are equal to one tooth interval. The propelling pawl is prevented from entering the notches or spaces between the teeth at certain points along the plate, either by omitting a notch between teeth so as to present a smooth surface between two adjacent teeth, or by providing a permanently fixed or adjustable deflector for deflecting the pawl from the teeth. Such blocks, by whatever means provided, are disposed to be opposite the propelling pawl when the code plate is in a predetermined "B" position, which is preferably exactly one tooth interval beyond the position at which the code plate would stop when the correct, predetermined integer signal is received (although other positions may be desirable in some instances). It is evident that the code plate can be moved beyond the "B" position only by a long propelling stroke of the pawl which carries the plate to and beyond such "B" position, i. e., one which begins before the plate is at such "B" position. Since, in the preferred embodiment, the first stroke of each integer signal is the long stroke, such a plate can be moved beyond the said "B" position only when it was moved by the last step of a preceding integer signal to a position exactly one short step before said position.

According to another important feature of the invention, which is preferably combined with that described in the foregoing paragraph, the code plate is provided with any suitable propelling means and is biased for movement toward a normal or starting position; and retaining means, such as a retaining ratchet pawl or brake, engageable with the plate, is provided. The retaining means is operable only when the plate is, at the cessation of the integer signal, occupying a predetermined position "A." A preferred means of achieving such retention, particularly suitable where the receiver is subject to vibrations, is to use a pivoted retaining pawl having a ratchet action and urged by a resilient force toward a position to release the plate for retrograde motion whenever no integer signal is being transmitted, but is held positively in its locking position against said resilient force when the plate was, at the cessation of the integer signal, occupying a predetermined position "A," i. e., when the plate was advanced by such signal to such predetermined position. By this arrangement the plate will return to or toward its normal position after having been advanced by the propelling means upon the cessation of each integer signal unless the signal was such as to advance the plate to said predetermined position "A." When this combination of elements is employed in combination with those described in the preceding paragraph the predetermined position "A"' is preferably, related to position "B" so that the predetermined position "A," at which the retaining means is held in its locking position, is one step nearer to the normal position of the plate than the predetermined position "B."

The blocking and/or the holding means according to the two foregoing paragraphs are preferably made adjustable by mounting them on the code plate in holes provided for the purposes. The code to which a particular selective device will respond can then be varied. Moreover, it is convenient to arrange the blocking and holding means together as one assembly, e. g., by providing a deflector to perform the blocking function and a catch to perform the holding function on a common cap.

The propelling means, the mechanism for limiting the lengths of the propelling strokes, and the retaining means are operated by electromagnetic means connected to the signal circuit and having two armatures, viz., a fast-acting armature and a slow-acting armature. The electromagnetic means may have a single solenoid for actuating both armatures, or several solenoids with separate cores may be used. The fast-acting armature is adapted to reciprocate with each current interruption or current impulse within a single integer signal, and is connected to reciprocate the propelling means, e. g., the propelling pawl. The slow-acting armature is adapted to assume one of two positions: a first position when an integer signal is being transmitted, and a second position at other times, e. g., between successive signals. The slow-acting armature performs two functions: (1) In moving from its second position to its first position immediately following the beginning of an integer signal it moves or permits the movement of a stroke control member or stop for altering the lengths of the propelling strokes. (2) It controls the operation of the retaining means by urging it toward locking position in the first position of the armature and urging it towards unlocked position for releasing the code plate for retrograde movement in the second position of the armature.

According to a specific embodiment herein described, the stroke control member is in the form of a pivoted stroke control lever having a pawl-engaging limit stop, which can be moved to an operative position with the stop interposed in the path of the propelling lever or propelling pawl or retracted into an inoperative position with the stop away from such path; the lever can be resiliently connected to the slow-acting armature to be urged to its inoperative position when the armature is in its second position and to be free to move into said operative position under tension of a spring when the armature is in its first position. The stroke control lever can further, be provided with an engaging finger which is engageable with an abutment connected for reciprocation together with the fast-acting armature so as to be clear of the engaging finger when the propelling pawl is retracted, but to move into the path of the engaging finger so as to prevent the complete movement of the stroke control lever to its operative position simultaneously with the propelling stroke of the propelling pawl. This abutment may be mounted on the propelling lever which actuates the propelling pawl, thereby obviating the need for an auxiliary lever. The stroke control lever can also be connected positively to the slow-acting armature or form a part thereof. Because the abutment is actuated by the fast-acting armature it moves into a position to intercept the engaging finger during the first propelling stroke in any integral signal, preventing the more slowly moving stroke control lever from completing its movement to its operative position; as a result the first stroke will be a long stroke. When the fast moving armature is retracted in preparation for the second propelling stroke the abutment is moved away from the engaging finger, thereby permitting the stroke control lever to complete its movement to operative position, whereby the second propelling stroke will be limited. Since the slow-acting armature remains in its first position throughout the transmission of a complete integer signal it will permit the stroke control lever to remain in operative position, and not only the second stroke but also any subsequent strokes of the same integer signal will be limited by the stop. It may be noted that "length of the propelling stroke" is herein used to denote the length of the part of the stroke which advances the code plate and not necessarily to the distance through which the propelling pawl moves, and that other arrangements for controlling the length of the propelling stroke, e. g., controlling the tooth which is engaged by the pawl, such as are known in typewriter platen mechanisms, may be used.

As was heretofore indicated, the code plate may serve as a control element for any signal device or mechanism to be controlled at a remote station, such signal device or mechanism being adapted to be put into or out of operation when the code plate occupies or reaches a predetermined position through any electrical or mechanical device responsive to the position of the plate. By way of specific example, the device illustrated in the drawings uses a circuit control device comprising a first electrical contact on the code plate and a second, movable contact mounted on the stroke control lever so as to sweep the path of the first contact when the stroke control lever is returned to inoperative position by the movement of the slow-acting armature to its second position when the integer signal has been completed. In thus sweeping the path of the first contact it will engage the first contact and complete a controlled electric circuit when and only when the code plate is the time in an advanced position with the first contact opposite the second contact.

The invention will be described in greater detail by reference to the accompanying drawings forming a part of this specification and illustrating certain preferred embodiments wherein:

Fig. 3 is a horizontal sectional view taken on line 3—3 of Fig. 2;

Fig. 4 is a sectional view on line 4—4 of Fig. 1, showing only the upper part of the mechanism;

Figs. 5 and 6 are an enlarged side and end view respectively, of a cap;

Figures 1, 2:
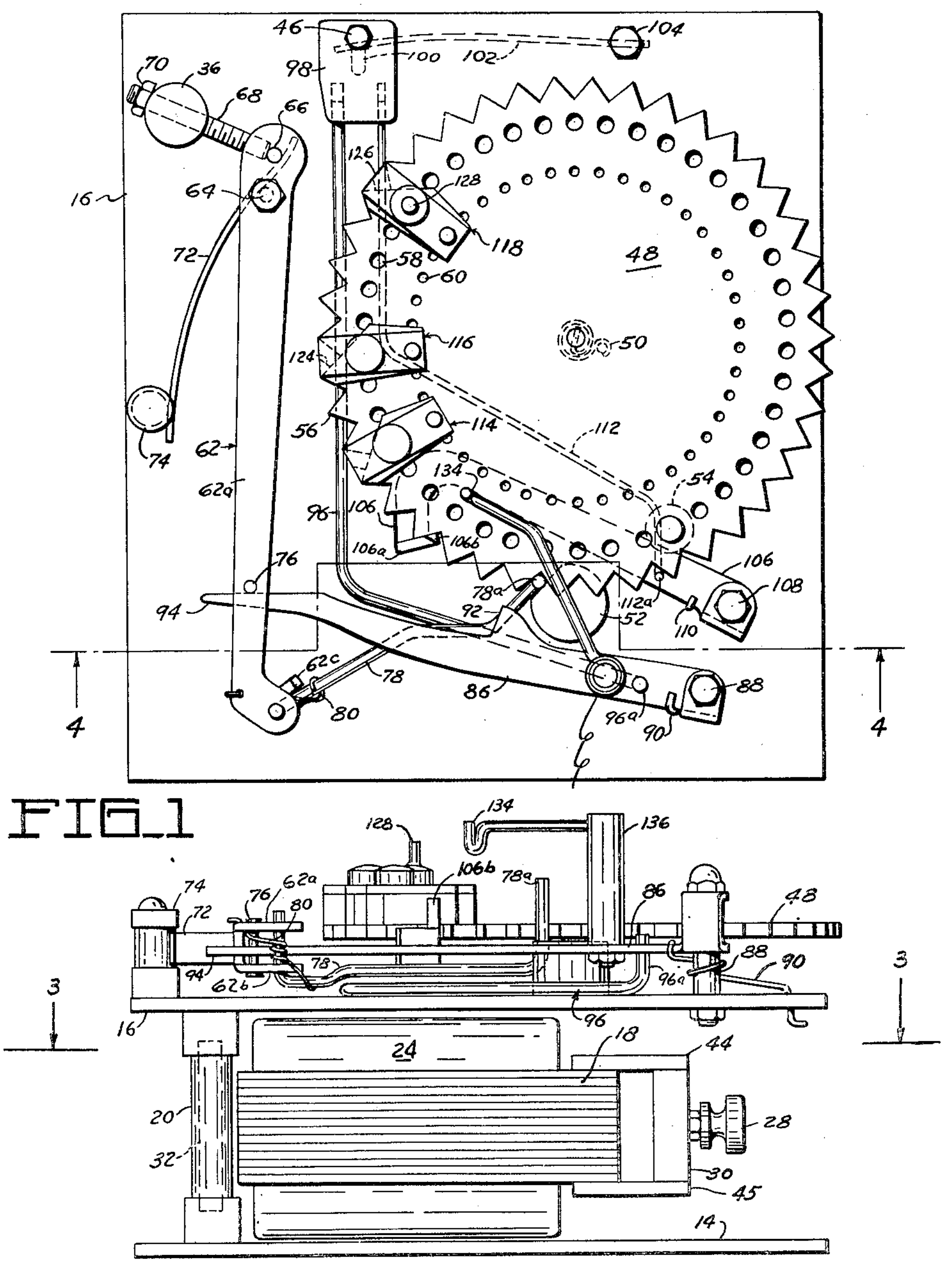
Fig. 1 is a plan view of the selector.
Fig. 2 is a front elevation view.

Referring particularly to Figs. 1–8 of the drawings, the selector device is illustrated in its actual form in Figs. 1–6, inclusive. However, it being difficult to grasp the operation of the device readily from these figures, the device is illustrated diagrammatically in Fig. 7, wherein all operating parts have been spread out substantially in one plane so as to make the operation of the device easily understandable; except as otherwise stated, reference numbers on Fig. 7 designate the corresponding elements as in Figs. 1–6, wherein the parts are variously shaped and compound and the rods, levers, springs, etc., overlap one another.

The device comprises a bed plate 14 supporting a table plate 16, between which are mounted an E-shaped laminated magnetic core 18, a fast-acting armature 20 and a slow-acting armature 22. The core is provided with a winding 24 connected to binding posts 26 and 28 on an insulated support 30. The armature 20 is pivotally mounted on a vertical journal 32 and is adapted to be attracted by the leg 34 of the core; it carries an upright rod 36 for actuating the propelling lever and pawl, to be described. The leg 38 of the core carries a lug 40, such as a heavy ring of conductive metal, e. g., copper, and is located to actuate the slow-acting armature 22, which is pivotally mounted on a vertical journal 42 secured to supporting plates 44 and 45. The lug 40 influences the magnetic flux in the leg 38 of the magnet so that the armature 22 will be released during the time that electric current is being interrupted at close intervals, i. e., during the transmission of an integer signal when the selector is connected by the binding posts to a signal circuit of the closed type. Armature 22 carries an upright rod 46.

The control element or code plate is in the form of a toothed wheel 48 journalled for rotation on the table plate 16 and provided with a spring 50 urging it toward a starting or normal position. The normal position is determined by a stop 52 fixed to the plate 16 and engaged by a pin 54 extending beneath the wheel 48. The notches or teeth 56 on the wheel are evenly spaced. A pair of holes 58 and 60 is located in the wheel opposite each tooth 56 for mounting caps to be described hereafter.

A propelling lever 62 is pivoted about a vertical journal 64 fixed to the table plate, and has two parallel, rigidly connected portions **62*a* and 62*b*. (In Fig. 7, the lever and armature are one piece, forming a lever-armature 20—62.) A vertical connecting pin 66 fixed to the lever near the journal cooperates with a threaded, adjustable thrust pin 68 on the upright rod 36, which may be fixed in adjusted position by a lock nut 70. A leaf spring 72 engages the journal 64, pin 66, and pin 74 fixed on the table plate to urge the propelling lever in a counter-clockwise direction. The propelling lever is further provided with a vertical abutment pin 76 extending between the portions 62*a* and 62*b*, and with a pair of holes at the end in which a propelling pawl 78 is pivotally mounted. The pawl is biased for movement in a counter-clockwise direction for engaging the teeth 56 by means of a light coil spring 80 wound about the vertical part of the pawl 78 between the upper and lower portions of the propelling lever. The pawl is formed of a stiff wire and has an upright engaging portion 78*a* at its free end which is engageable with the wheel teeth to advance the wheel upon reciprocating movement of the lever 62. The upright portion is also adapted to engage the flattened side face of the stop 52, thereby limiting the counter-clockwise movement of the propelling lever. (In the diagrammatic representation of Fig. 7 the rod 36 and pins 66 and 68** are not shown.)

When the fast-acting armature 20 is attracted by the electromagnet, i. e., moved in a clockwise direction, the thrust pin 68 engages the side of the pin 66, thereby pivoting the propelling lever 62 in a clockwise direction; during this pivotal movement the propelling pawl 78 does not drivingly engage the teeth 56 but slides over the teeth, being kept in engagement therewith by the relatively weak spring 80, the tension of which is overcome each time the engaging portion **78*a* of the pawl rides toward a tooth apex. This function follows from the geometrical relation of the wheel teeth to the line of action of the propelling pawl between the engaging portion 78*a* and its pivot axis at the free end of the lever 62, it being noted that this line of action is canted somewhat with respect to the teeth. The armature 20 carries an adjustable screw 82 which is in alignment with a set screw 84, the latter screw serving also to secure the lug 40 to the magnetic core. By adjusting the screw 82 it is possible to adjust the attraction stroke of the armature 20**, this stroke being concurrent with the recovery stroke of the propelling lever and propelling pawl.

When the electromagnet is de-energized it releases the armature, permitting the spring 72 to cause the propelling stroke by pivoting the lever 62 in a counter-clockwise direction. This moves the pin 66 against the thrust pin 68, causing counter-clockwise rotation of the armature 20 away from its core leg 34; it also pushes the propelling pawl 78 against the teeth of the wheel, causing counter-clockwise rotation of the wheel until the pawl engages a stop. When a long propelling stroke is made the pawl advances until the engaging portion **78*a* strikes the fixed stop 52**. In the specific embodiment described herein the wheel is advanced a distance corresponding to two tooth intervals by such a long propelling stroke, and Fig. 1 shows the wheel thus advanced by two tooth intervals from its normal position. A stroke of such length can be insured by adjusting the set screw 82 to limit the recovery stroke of the pawl and insuring that it is initially in engagement with the proper wheel tooth.

Figure 7:
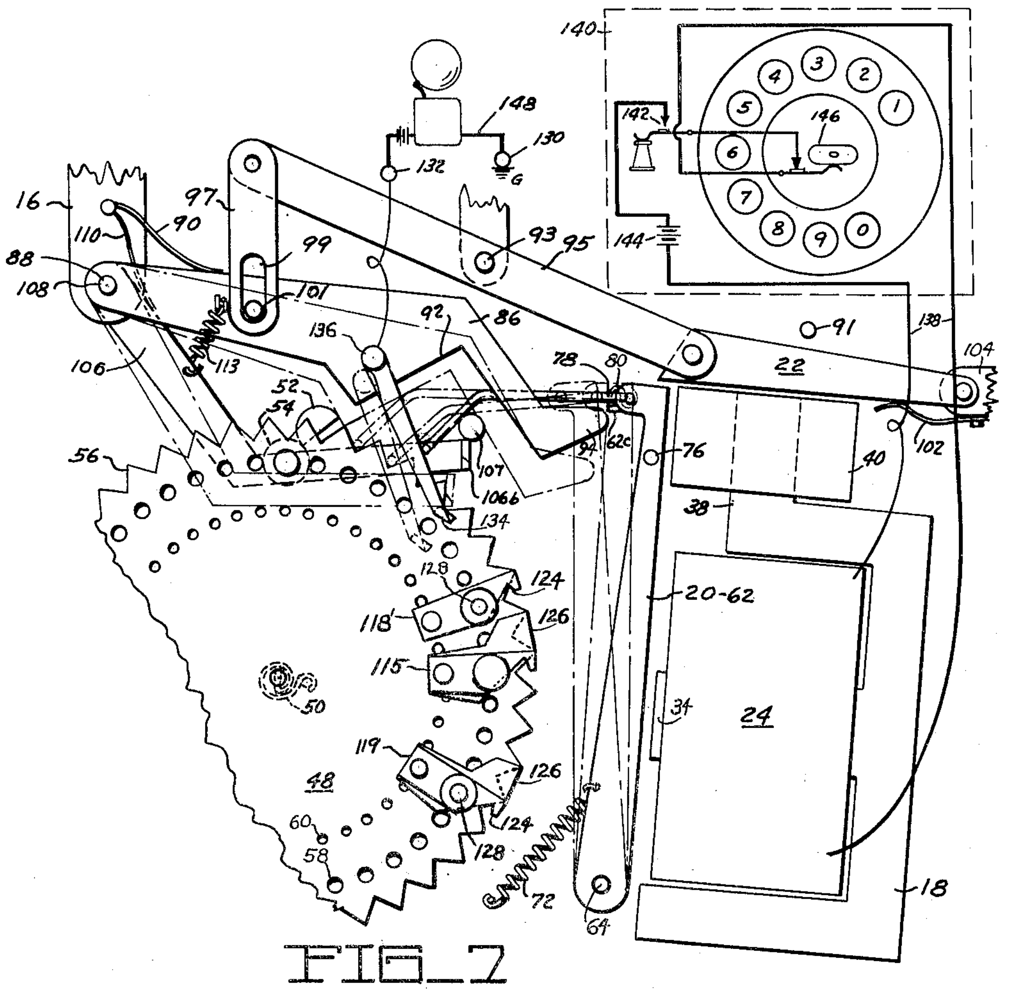
Fig. 7 is a plan view, somewhat diagrammatically arranged, showing the main features of the invention, together with the electric circuits associated therewith.

To permit a short propelling stroke to be made there is provided a stroke control lever 86 pivotally mounted on a journal 88 fixed to the table plate. This lever is provided with a light coil spring 90 urging it in a clockwise direction. The lever carries a pawl-engaging stop 92 in the form of a lateral projection and an engaging finger 94 which extends between the upper and lower parts 62a and 62b of the propelling lever. When the lever 86 is in its inoperative, counter-clockwise position shown in Fig. 1 of the drawing, the pawl-engaging stop 92 is out of the path of the propelling pawl. When it is moved clockwise to its operative position (as indicated in dotted lines in Fig. 7) the stop 92 is in the path of the propelling pawl, causing the engaging portion 78a thereof to strike against the stop 92. thereby terminating the propelling stroke after the wheel 48 has been advanced for a distance of only one tooth interval. In Fig. 7 the stop 92 is engaged by an intermediate part of the pawl, where the latter is bent toward the wheel, as shown, instead of by the engaging portion 78a. The engaging finger 94 is shown in Fig. 1 to be in engagement with the abutment 76. being urged against this pin by the spring 90 and prevented by the abutment from moving into operative position. When the propelling lever 62 makes a recovery stroke the abutment 76 moves beyond the end of finger 94, freeing the lever 86 to move clockwise into operative position.

The lever 86 is actuated by a slightly resilient push rod 96 having a sliding fit in a horizontal hole within a block 98 which is fixed to the top of the upright rod 46. The rod 46 extends vertically through a slot 100 in the table plate 16 and the block is slidable on the plate. The other end of the rod 96 is bent horizontally toward the pivot 88 to form a substantially right angle bend, and has its tip 96a turned upwards to enter a hole in the lever 86. The horizontal hole in the block 98 is long enough to accommodate the rod 96 when the lever 86 is in its clockwise or operative position; in its inoperative position shown in Fig. 1 the end of the rod 96 does not reach the inner end of the hole, so that a small amount of play or lost motion is provided. Hence, when the armature 22 is attracted by the leg 38 from the position shown in Fig. 1 the rod 96 and lever 86 will not move until a part of the movement of the armature and block has been completed. (In the diagrammatic representation of Fig. 7 the armature 22 is shown to be connected to a motion-reversing lever 95 pivoted on fixed pivot 93 and having a pivotal connection to a link 97 having a slot 99. The link 97 corresponds to the block 98 of Fig. 1. and the lost motion is permitted by the slot 99 in the link 97, within which pin 101 has a limited motion.) The armature 22 and block 98 are biased to positions away from the lever 86 and the magnet by means of a leaf spring 102 beneath the table plate 16, fixed to a supporting stud 104 and in engagement with the side of the rod 46. It is evident that when the armature 22 is released the spring 102 causes clockwise movement of the armature, thereby pulling the block 98 away from the end of the rod 96 (which, however, remains in the hole in the block) to the position shown in Fig. 1 and in solid lines in Fig. 7, and permitting the lever 86 to move to its operative position under tension of its spring 90 when the abutment 76 is moved clear of finger 94. This position of armature 22 is herein designated as its "first position." When the armature 22 is attracted by the magnet and moves to its "second position" the rod 96 is pushed to urge the lever 86 to inoperative position; movement of the lever 86 to inoperative position takes place when the abutment 76 is clear of the finger 94.

The wheel is retained in its advanced position against the force of spring 50 after each step by means of a retaining pawl 106 pivotally supported on a journal 108 and biased for clockwise rotation by a light coil spring 110 to bring its free or engaging end against the teeth of the wheel. The intermediate portion of the pawl extends beneath the wheel and the free end is turned up to provide a vertical portion 106a. The vertical portion of the pawl is cut off at the level of the upper face of the wheel except for an upright extension 106b at the corner nearest the wheel. The cross sectional shape of the extension is such as lie fully within the vertical projection of the recess between the teeth when the pawl is in locking position against the wheel. In other words, when viewed from the top, a circle concentric with the wheel having a radius equal to the distance to the apexes of the teeth would completely enclose the extension 106b. It should be noted that the line from the pivot axis at 108 to the end 106a is canted with respect to the teeth so that the pawl does not prevent counter-clockwise or advancing rotation of the wheel, but is effective to lock the wheel against clockwise rotation when in locking position; it therefore acts as a ratchet. The pawl may be moved to unlocking position by means of a resilient rod 112 having a sliding fit within a horizontal hole in the block 98 at one end and having its other end 112a turned up to enter a hole in the pawl. The resilient rod has two substantially right angle bends to permit flexure. The end of the rod 112 preferably does not extend entirely to the end of the hole in the block 98, thereby providing some lost motion similar to the lost motion previously described between the block 98 and rod 96. (In Fig. 7 the pawl 106 is actuated by the link 97 through spring 113 to achieve the same operational relationship.)

The wheel 48 carries one or more caps 114, 116 and 118. These caps have small pins 120 adapted to enter the holes 60 and larger screws 122 adapted to engage the holes 58, which are internally threaded. The lower portions of the caps have catches 124 shaped as shown in Figs. 5 and 6 for holding the retaining pawl in locked position by engaging the extension 106b. When one of the caps is opposite the retaining pawl when the armature 22 moves to its second position the rod 112 cannot push the pawl to its unlocked position but will flex. When one of the caps is not opposite the pawl at this time the pawl is released by rod 112 and the wheel 48 is free to return to its normal position with the pin 54 bearing against the stop 52. Each cap further carries a deflector plate 126, the radially outer edge of which is above a line joining the apexes of two adjacent teeth and forms a deflecting surface cooperating with the upturned engaging portion 78a of the propelling pawl and preventing it from entering the space between said teeth for driving engagement. Hence, when the cap is opposite the propelling pawl at the beginning of a propelling stroke the pawl will be deflected and will move on until stopped by the stop 92 without advancing the wheel. As will be evident from the operation to be described, the propelling pawl engages a deflecting plate only during a propelling stroke which is subsequent to the first stroke of an integer signal; during such subsequent stroke the lever 86 is in its operative or "first" position.

The positions of the wheel at which the deflecting surfaces of deflector plates 126 prevent driving engagement of the propelling pawl are herein referred to as predetermined positions "B," while those at which the catches 124 engage the extension 106b on the retaining pawl are referred to as predetermined positions "A." It is evident that the "A" and "B" positions occur in pairs and are spaced apart by one tooth intervals in the embodiment illustrated; as the wheel is advanced stepwise it reaches an "A" position one tooth interval before reaching its corresponding "B" position. In other words, the "A" positions are nearer to the normal position than the corresponding "B" positions.

The caps are identical except that the last cap 118 is provided with an upright extension 128 electrically grounded through the wheel and binding post 130, and forming a first electrical contact. Another binding post 132 is connected to a second electrical contact 134 in the form of a slightly resilient arm mounted on the stroke control lever 86 through an insulating support 136. The free end of this arm sweeps the circular path of the contact 128 whenever the lever 86 is moved. When the lever 86 is in its operative position the end of the contact 134 is inside of the said circular path and the contacts are brought together by the movement of the lever 86 toward its inoperative position, whereby the contact 134 strikes the radially inner side of the contact 128.

In Fig. 7 the caps 115 and 119 (corresponding to caps 114 and 118, respectively, of Fig. 1) have the deflectors 126 disposed over the notch adjacent to the notch in which the catch 124 is disposed. The pawl 78 in this case always engages the second notch from the catch 124 instead of the first notch, as in Fig. 1.

The device may be connected to a signalling circuit as indicated in Fig. 7 which shows a circuit 138 extending to a signal transmitting station 140 at which is located a telephone with the customary normally open calling switch 142 in series with the circuit and adapted to be closed whenever the receiver is taken off the support. The circuit further includes a source of electric power, indicated by a storage battery 144, and with a dial interrupter 146.

*Operation*

The operation of the device is as follows and applies to Figs. 1–6 unless otherwise noted: The device is initially de-energized, with both armatures released; the position of armature 20 is limited by engagement of the pawl 78 with stop 52, and that of armature 22 by engagement of rod 46 at the end of slot 100. (In Fig. 7 armature 22 rests against fixed stop 91.) When the receiver at station 140 is lifted the switch 142 is closed, thereby energizing the circuit 138 and applying a steady electric potential as indicated at point *a* in Fig. 8. This energizes the solenoid 24 and attracts both armatures: The armature 20 and lever 62 thereupon move clockwise, thereby retracting the propelling pawl 78, and lifting its end 78*a* away from the wheel because of engagement of a projection 62*c* on the lever 62 with the side of the pawl. Also, the armature 22 moves to its second position, thereby pushing the rod 112 and, hence, urging retaining pawl 106 away from the wheel. (In Fig. 7, when the armature 22 moves to its second position, the pawl 106 is pulled away by a spring 113 which performs a function equivalent to that of rod 112.) These movements free the wheel for rotation from the position shown in Fig. 1 (or from a position in which the wheel was left following a previous operation) to its normal position with pin 54 against stop 52 as shown in Fig. 7. The free end of the pawl 106 is, in this phase of the operation, swung away from the wheel until stopped by engaging the side of the pawl 78. (Optionally, the outward movement of pawl 106 may be limited by a fixed stop 107 as shown in Fig. 7.) Also during this phase the rod 96 pushes the stroke control lever 86 to an extreme counter-clockwise position with finger 94 in contact or almost in contact with the coil spring 80 at the end of the lever 62. (In Fig. 7, pin 101 moves lever 86.)

When a digit or integer is dialled at the station 140 the interrupter 146 opens the circuit in rapid succession for a number of times determined by the value of the integer. In the example to be described the number of interruptions equals the value of the dialled integer, except that there would be ten interruptions for the digit zero. Such interruptions are indicated at point *b* in Fig. 8 and may, for example, occur at the rate of about five to twenty per second, ten being typical. The fast-acting armature 20 (or lever-armature 20—62 of Fig. 7) reciprocates synchronously with the interruptions, permitting the spring 72 to cause a propelling stroke of the pawl 78 at each current interruption. In Fig. 1, the end 78*a* in each propelling stroke enters the notch next to the one containing the end 106*a* of the retaining pawl; in Fig. 7 it enters the second notch from that containing the retaining pawl.

The magnetic flux path for the armature 22 includes the leg 38 of the core, the armature 22 itself, the armature 20, and the leg 34 of the core. The reluctance of this path is increased each time the armature 20 is released and the free end thereof moves away from armature 22, decreasing the magnetic flux to release the armature 22. The lug 40 prevents these rapidly recurring current impulses of relatively short duration (e. g., of the order of $\frac{1}{20}$ of a second) from building up a sufficient magnetic flux in the leg 38 while the armature 20 is attracted; as a result, the armature 22 is released immediately at the first current interruption when any integer is commenced and remains in its first (i. e., released) position throughout the transmission of the integer. It thereby frees the levers 86 and 106 for clockwise pivotal movement to their operative and locking positions, respectively. The clockwise movement of the lever 86, caused by the relatively weak spring 90, is slower than the simultaneous counter-clockwise propelling stroke of lever 62, whereby abutment 76 is moved into the path of the engaging finger 94; consequently the stop 92 is held in an inoperative position during the first current interruption of any integer signal and the pawl 78 is free to advance until it strikes the fixed stop 52. Hence, the first propelling stroke of any integer signal is a long stroke, the first step of the wheel of any group of steps corresponding to the same integer signal is equal to two tooth intervals. At the end of the first interruption the lever 62 is retracted, moving the abutment 76 clear of the finger 94 and permitting the lever 86 to complete its clockwise movement to operative position. During the second and any subsequent current interruptions of the same integer signal the propelling stroke of the pawl 78 is limited by the stop 92, so that the wheel is advanced a short step, equal to one tooth interval, at each subsequent interruption.

Figure 8:
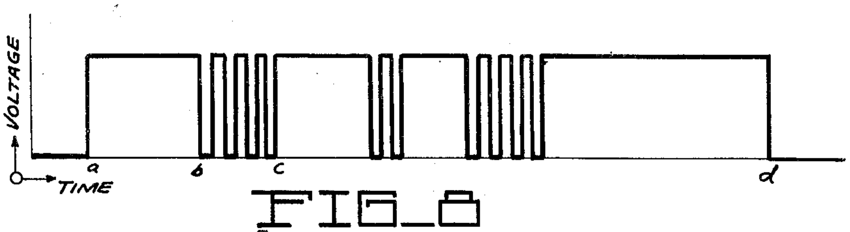
Fig. 8 is a diagram illustrating the signal used to actuate the selector according to Figs. 1–7.

When the integer signal is completed the circuit is again closed and a steady electric potential is applied to the circuit, as is indicated at point *c* in Fig. 8. This causes both armatures to be attracted: Pawl 78 is retracted, pawl 106 is urged by rod 112 away from the wheel, and lever 86 is pushed by rod 96 to its extreme counterclockwise position. If the integer signal was such as to advance the wheel to its first predetermined "A" position the retaining pawl 106 will be held by the catch 124 on the cap 114 (cap 115 in Fig. 7) and the wheel will be retained at its advanced position. The caps 114, 116 and 118 are shown in Fig. 1 to be set to make the device respond to a code consisting of the integer signals "4-2-4," and in Fig. 7 the caps 115 and 119 are set for the code "4-3"; the catch 124 on the first cap 114 (or 115 in the case of Fig. 7) will, therefore, engage the extension 106*b* on the pawl only when the wheel was advanced exactly five tooth intervals by the first integer signal. Should a shorter integer signal, or an integer signal carrying the wheel immediately beyond the fifth tooth, have been transmitted, the wheel would return to its normal position immediately after the completion of the integer signal. The expression "immediately beyond" is used in the foregoing statement without reference to the function of the deflectors; it was used because it is evident that if the wheel were advanced a total of eight tooth intervals the pawl 106 would be held by the catch on the cap 116. Hence, the wheel would return if it were advanced one or two tooth intervals beyond the "A" position.

The operations of the two preceding paragraphs are repeated for each subsequent integer signal. Thus, if the number "2" is dialled next the wheel is advanced an additional three tooth intervals to bring it to its second predetermined "A" position with the catch on cap 116 holding the retaining pawl; and if the number "4" is dialled for the third integer the wheel is advanced five additional tooth intervals to its third predetermined "A" position, with the catch on the cap 118 holding the retaining pawl. At the completion of this third signal the contact 134 engages the contact 128 with a sharp stroke as the lever 86 swings to its inoperative position, thereby closing a controlled circuit connected to the binding posts 130 and 132, e. g., the ringing circuit 148 shown in Fig. 7. It is noted that the circuit control elements 128—134 operate at a predetermined time, i. e., shortly after the completion of the integer signal.

When the receiver at the station 140 is replaced on its support the switch 142 is opened, thereby de-energizing the circuit as indicated at point *d* in Fig. 8. This causes the armatures to be released. The armature 22 thereupon moves to its first position and the lever 86 is freed to swing toward operative position, but is prevented from reaching it by engagement of the finger 94 with the abutment 76; however, the lever moves far enough to separate the contacts 134 and 128. Simultaneously the retaining pawl is urged to locking position by its spring 110. Also simultaneously, the propelling lever makes a long stroke and the wheel advances two tooth intervals, coming to rest in a position beyond the third or final predetermined "A" position, with the contacts 128 and 134 displaced circumferentially. Movement of the contact 128 beyond the contact 134 is possible because the horizontal portion of the latter is higher than the former.

It may be noted that the position of the wheel shown in Fig. 1 is that which is assumed when the circuit 138 has been deenergized at a time when the wheel was in its normal position. Thus, when a steady current is applied, the wheel returns to its normal position from the final position of rest described in the foregoing paragraph (as well as from any other position except one of the predetermined positions "A"). When the circuit is thereafter again opened and left open the propelling pawl makes one long stroke, advancing the wheel to the position shown in Fig. 1.

In the operations just described the deflectors 126 played no part, and evidently the device would have responded selectively to a predetermined code without such deflectors, and without making use of the stop 92 with the stroke control lever. In other words, were it not for the deflectors there would be no need to vary the lengths of the steps within a signal, and the device could have been operated by advancing the wheel four, two and four tooth intervals in succession (upon spacing the caps closer together) instead of five, three and five tooth intervals for the signal comprising the four, two and four interruptions. Such an embodiment, wherein stroke control and deflecting mechanisms are omitted, is contemplated according to the invention and may be suitable for certain purposes. However, such a simplification leaves open the possibility of an erroneous response, and greatly restricts the usable code combinations if such erroneous responses are to be avoided. For example, if the deflectors 126 were omitted from the device as previously described, no other modifications being made, the wheel could be brought to its final "A" position not only by signalling "4-2-4," but also by signalling "7-4," because a "7" signal would advance the wheel eight tooth intervals, bringing the cap 116 opposite the pawl 106, thereby having the same effect as the first two digits of the correct signal.

The deflectors 126 are provided on the caps to prevent such double response. As a result of these deflectors any integer greater than that for which the device has been preset is ineffective to advance the wheel and hold it in advanced position. For example, when the digit "7" is transmitted, the pawl 78 advances the wheel for a distance of six tooth intervals, i. e., during the first five strokes, bringing the deflector plate 126 on cap 114 opposite the engaging portions 78*a* of the pawl; in other words, the wheel is advanced to its first "B" position. During the sixth and seventh strokes of the propelling pawl the engaging portion 78*a* of the pawl slides along the edge of the deflector without causing the wheel to advance further. It should be noted that the wheel was carried one step beyond its first "A" position; this prevents the catch 124 from holding the retaining pawl 106 in locking position and permits the wheel to return to its normal position immediately following the termination of the seventh current interruption. The advantages of pairing off the predetermined "A" and "B" positions, and of spacing them only one tooth interval apart are obvious.

Figure 9:
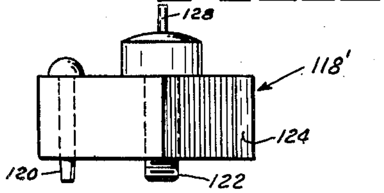
Fig. 9 is an elevation view of a modified form of cap suitable for making the device respond to more than one code.

The device may be adapted to permit all or a predetermined group of stations to respond to a common signal without interfering with the normal individual selective action as was described above. This is effected by providing one or more modified caps 118' shown in Fig. 9. These caps have the pins 120, screws 122, catches 124 and vertically extending contacts 128, exactly like the cap of Figs. 5 and 6, and differ therefrom only in omitting the deflector plate 126. Such a cap may be placed opposite a wheel tooth not otherwise provided with a cap, usually a tooth ahead of the first cap, so as to be brought opposite to the pawl 106 by a small integer signal.

As a specific example, such a cap may be mounted as shown in Fig. 7 to respond to an integer signal of "2" on all or on a preselected group of selector instruments connected to the common circuit 138. Whenever a "2" signal is transmitted all selectors advance one long step and one short step, i. e., three tooth intervals, and those selectors having a modified cap 118' will be retained in that position by engagement of the catch 124 with the extension 106b of the retaining pawl, while the controlled circuit will be closed by engagement of the contacts 128 and 134. The modified cap 118' will not, however, interfere with the advancement of the wheel when its assigned code signal is transmitted; thus, when the digit "4" is transmitted as the first integer signal of a code the wheel will advance five tooth intervals because the cap 118' has no deflector. This arrangement, of course, makes it impossible to utilize any code having "2" as its first integer for response by only one receiver. However, codes beginning with "1-1" are usable.

Figure 10:
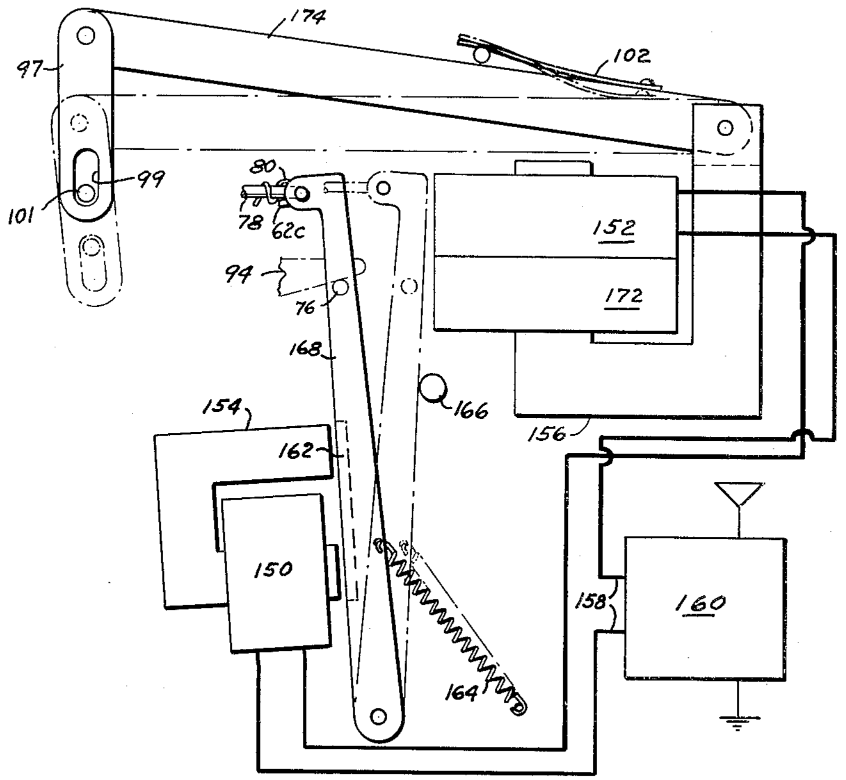
Fig. 10 is a fragmentary, somewhat diagrammatic view showing a modification of a part of the device illustrated in Fig. 7 adapted to an open type circuit.
Figure 11:
Fig. 11 is a diagram illustrating the signal used to actuate the selector according to Fig. 10.

The selector device may be adapted for operation on an "open" type circuit, as illustrated in Figs. 10, for responding to integer signals of the type indicated in Fig. 11. Since here the signal is made up of a series of impulses instead of interruptions, and it being desired to cause a propelling stroke during each impulse, the electro-magnet is modified somewhat. The arrangement shown in Fig. 10 is intended to replace corresponding parts of Fig. 7, the other elements of Fig. 7 remaining unaltered.

In Fig. 10 the electro-magnet is constructed as two separate units, including windings 150 and 152 associated with laminated iron cores 154 and 156, respectively. The windings are connected in series with each other and with a signal circuit 158, which may be energized by a radio receiver 160, which causes integer signals in the form of impulses as shown in Fig. 11 to be impressed on the circuit 158 and windings.

The electro-magnet 154 actuates a fast-acting armature 162 which is normally held away from the core by a spring 164, so as to rest against a stop 166 when the winding is de-energized. Armature 162 is connected to a propelling lever 168 carrying a propelling pawl 170 constructed as was previously described for pawl 78 and similarly urged against the wheel teeth by a spring 80 for advancing the wheel when making a propelling stroke each time the armature is attracted. The construction and operation of the pawl are like those previously described with the exception that the propelling stroke occurs when the circuit 158 is energized. The electro-magnet 156 is provided with a lug 172, such as a heavy ring of copper, surrounding the core 156 and on the side of winding 152 away from the armature to make the armature 174 slow-releasing. The armature 174 will, therefore, be attracted to its core upon the transmission of the first impulse of an integer signal and remain attracted throughout the transmission of the integer signal, i. e., between points $e$ and $f$ in Fig. 11. It leaves the core under tension of spring 182 at the end of the last electrical impulse. In this construction, the "first position" of the armature 174 (which corresponds to the armature 22 of the previous embodiment) is its attracted position, and its "second position" is its released positions, shown in solid lines in Fig. 10. The armature 174 is connected to the stroke control lever and to the retaining pawl to release them for rotation in a clockwise direction when the armature is in its first position, and to urge them in a counter-clockwise direction when the armature is in its second position. This relation between the numbered positions of the armature and the motions of the lever 86 and pawl 106 is the same as in the previously described embodiment, but the linkage is modified to effect this relation by omitting the reversing lever 95 and connecting the link 97 to move directly with the armature 174.

It is evident that the operation of the device according to Fig. 10 is the same as that previously described insofar as the mechanism is concerned. Prior to the transmission of any signal both electro-magnets are de-energized; the propelling pawl 78 is, therefore, retracted and the armature 174 is in its second position—a condition similar to that which prevailed between the times $a$ and $b$ in Fig. 8. The wheel will be in its normal position. When the first electrical impulse of a series of impulses forming an integer signal is transmitted (point $e$, Fig. 11) the armature 162 causes the pawl 78 to make a long propelling stroke; simultaneously the armature 174 moves to its first position, permitting the lever 86 and pawl 106 to move into operative and locking positions, respectively. The fast acting armature 162 is released at the end of the first electrical impulse, permitting the spring 164 to retract the propelling lever and pawl, and freeing the finger 94 to move the stroke control lever fully to its operative position. The subsequent propelling strokes are, therefore, short strokes. At the end of the last electrical impulse of the integer signal (point $f$, Fig. 11) the armature 162 is immediately retracted by its spring 164, and very soon thereafter the slow-release armature 174 returns to its second position under tension of its spring 182, thereby urging the lever 86 to its inoperative position and the retaining pawl 106 to its releasing position, and permitting the wheel to return to its normal position unless the proper digit was transmitted.

The wheel will remain in its final predetermined position "A" until another impulse of any duration is transmitted. Thus, a single impulse may be transmitted subsequent to the completion of the above-described operations, or before transmitting a new coded signal.

As was indicated above, the invention may be modified in various ways without departing from the spirit thereof. Thus, according to some of these modifications the code plate may be mounted for linear instead of rotary motion; the retaining means used to hold the code plate against retrograde movement during recovery strokes of the propelling pawl need not operate on the same teeth or notches as the propelling pawl, and it need not be used to hold the plate in advance position between integer signals and auxiliary retaining means may be provided for this purpose; the function of holding the plate in one of the advanced "A" positions need not be performed by a retaining pawl, but may be performed by some other mechanism, such as a brake; the code plate need not be adjustable, but may be made to respond to a predetermined code only; the length of the long step need not be twice that of the short steps, but may be any other greater distance; finally, the use of deflectors for preventing further advancement of the plate when it is in one of its "B" positions at the beginning of the propelling stroke is not necessary, and other mechanism, such as a raised portion on code plate may be substituted.

Figure 13:
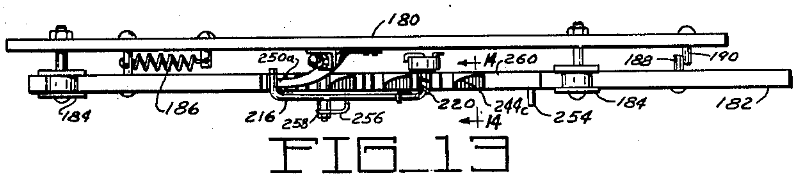
Figs. 12 and 13 are an elevation and plan view of a further modified embodiment.
Figure 12:
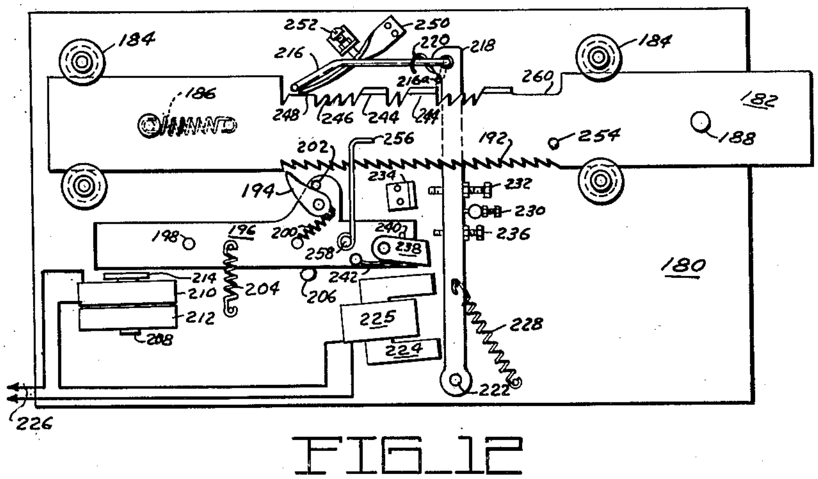
Figure 14:
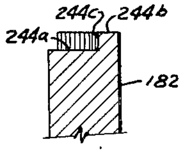
Fig. 14 is a sectional view taken on line 14—14 of Fig. 13.

All of these modifications are applied in the modified embodiment according to Figs. 12–14, it being understood that they may be individually applied and are all shown in one device merely to avoid the use of numerous additional drawings. Referring to the drawings, the device is shown for operation on an "open" type circuit and comprises a supporting plate 180 on which is mounted an elongated code plate 182 movable longitudinally on guide rollers 184 and urged by a spring 186 to normal position as shown with stop movable pin 188 against fixed stop pin 190. The lower edge of the plate has serrations or teeth 192 which may be engaged by a retaining pawl 194 pivotally mounted on an armature 196 which is rotatably supported by plate 180 at 198. The pawl is urged by a spring 200 to engage the teeth, but can engage a stop 202 to permit the pawl to be disengaged when the armature is turned clockwise. The armature is urged by a spring 204 to retracted or "second" position against a fixed stop 206 and cooperates with an electro-magnet 208 having a winding 210 and a copper lug 212 to make the pawl-armature slow-releasing, i. e., to retain attracted throughout the transmission of an integer signal. A light copper ring 214 slightly delays the attraction of the armature, i. e., makes it slightly slow operating. When in its attracted or "first" position the pawl prevents retrograde movement of the code plate.

The plate has a series of notches or teeth on its upper edge adapted to be engaged by a propelling pawl 216 which is pivotally connected to the upper end of a propelling lever 218 and biased in a counter-clockwise direction by a light spring 220 for engaging the teeth. The rear end 216*a* of the pawl engages the edge of lever 218 to limit counter-clockwise turning of the pawl to the extent shown in Fig. 12. The lever 218 is pivotally supported by the plate 180 at 222 and acts as a fast-acting armature, cooperating with an electro-magnet 224 having a winding 225 which may be connected in series with the winding 210 and connected to a signal circuit 226. Whenever the electro-magnet is de-energized the lever-armature is held by a spring 228 against an adjustable stop 230 fixed to the plate 180. When attracted by the electro-magnet the lever-armature moves counter-clockwise until the adjustable stop pin 232 engages the fixed stop 234, or the adjustable stop pin 236 engages a dog 238 pivoted at the end of the armature 196 and urged upwardly against a stop 240 by a leaf spring 242. As is shown, the pins 232 and 236 are mounted in the lever-armature 218 and provided with lock nuts.

The notches or teeth on the upper edge of the code plate are spaced apart at different intervals so that the long intervals are three times as long as the short intervals, and are arranged for a coded signal "4–2–4". There are provided long teeth 244 and short teeth 246, "short" and "long" having reference to the distance longitudinally with respect to the code plate. A long tooth 248 is provided at the front end of the row of teeth. The teeth 246 and 248 are low teeth, while the intermediate long teeth 244 have low portions 244*a* and higher portions 244*b* which may have roughened surfaces. A resilient brake 250 is mounted on the plate 180 and twisted through 90° so as to have its free end flexible both vertically and horizontally. As seen in Fig. 13, it extends diagonally over the edge of the code plate and has one corner 250*a* clipped to cooperate with the vertical surface 244*c* separating the low and upper portions of the teeth 244. An adjustable set screw 252 permits the height of the free end of the brake spring to be adjusted so as to be clear of the teeth 246 and 248, as well as of the low portions 244*a*, but to exert a braking action against the raised portions 244*b*. It is evident that when the code plate 182 is advanced the brake spring will bear against the raised portions 244*b* and will hold the plate in an advanced position whenever a digit signal leaves the plate with the brake in engagement with one of the teeth 244. These positions are the predetermined "A" positions. The teeth are shaped so that the brake 250 will slip off the raised portions 244*b* and be over the lower portion 244*a* when the plate is advanced one short step beyond the said "A" position. From such a position or from any farther advanced position the plate returns under tension of spring 186. When the nose 250*a* of the brake spring engages the surface 244*c* during the return movement of the plate the brake spring will be deflected laterally a small distance so as to avoid braking action. The plate will, therefore, be held in any of its "A" positions only when it was moved to such position by an advancing motion. This holding action does not depend upon the operation of the retaining pawl 194.

An electrical contact 254 is fixed and electrically grounded to the plate 182 to be opposite the horizontal end or engaging portion of a hook-shaped contact 256 mounted on an insulated support 258 on the armature 196. The length of the contact 256 is such as to move the engaging portion above the path of the contact 254 when the armature is in its first position, and to be below the path when the armature is in its second position.

The operation of the device according to Figs. 12–14 is as follows: The circuit 226 is initially de-energized and the parts are in the positions shown in the drawings. When an integer signal, consisting of four short, rapidly recurring electrical impulses is received the lever-armature 218 makes four propelling strokes, returning to normal after each stroke. The armature 196 is attracted to its first position when the first impulse is received and remains there throughout the reception of the four impulses; however, the lever-armature 218 is faster acting, and the pin 236 does not engage the end of the dog 238 in its first propelling stroke but, instead, moves until the pin 232 strikes the stop 234. The code plate is thereby advanced one long step, bringing the pawl 194 into the fourth notch, i. e., three notches beyond its initial position, for holding the plate during the first recovery stroke of the propelling pawl. During this recovery stroke the dog 238 moves counter-clockwise and is effective to limit the lengths of subsequent propelling strokes to advance the plate one short step. At the completion of the fourth propelling stroke the raised portion 244*b* of the first long tooth is brought under the brake spring 250 and the code plate is maintained in its advanced position although the retaining pawl is retracted upon movement of the armature 196 to its second position.

When the digits "2" and "4" are thereafter successively received the operations are repeated except as to the number of strokes, and the brake spring rests on the high portion of the third long tooth 244, the free end of the contact 256 being then immediately above the engaging part of contact 254. When the electro-magnets are de-energized the clockwise movement of the armature 196 forces the contact 256 against the upper side of the contact 254 to close a controlled circuit.

To restore the device to normal a signal of any duration is transmitted; this moves the contact 256 upward and advances the code plate by a long step to bring the depressed, smooth portion 260 of the plate under the brake spring. When this restoring signal is ended and the two pawls have been retracted, the code plate returns to normal, the brake spring being repeatedly deflected laterally by engagement with the vertical surfaces 244*c* and the contact 254 passing above the contact 256, without engaging it. During this return movement the forward end of the pawl 216 is held above the teeth because of the previously described engagement of its rear and 216*a* with the edge of the lever-armature 218; hence the front end of the pawl is at or slightly above the level of the nose of the brake-spring whenever the electromagnet 224 is de-energized.

When an integer signal smaller than the correct or predetermined digit is transmitted the armatures will be restored to their released positions before the brake spring has engaged the high portion on one of the long teeth 244; hence, the plate will return to its normal position immediately upon the completion of an integer signal, i. e., when both armatures are restored to normal. On the other hand, when too large a digit signal is transmitted, the pawl 216 makes one or more excess strokes after the plate has reached its "A" position; only the first excess stroke advances the plate one short step to its predetermined "B" position, and during this step the brake spring 250 slips off the high portion 244*b* onto the low portion 244*a* of the high tooth, whereby no further braking action is effected. Subsequent excess strokes, if any, result in a sliding movement of the nose of the pawl along the top of a long tooth 244 without drivingly engaging the plate, the long tooth acting as a blocking means preventing driving engagement. Immediately following the completion of the last excess stroke the code plate returns to its normal position.

Since the movable control element 48 or 182 may be either a disc or an elongated member as was above described, the word plate as used in the appended claims designating this element is to be taken to mean either form or other equivalent of this element. Also to be noted is that while propelling and retaining pawls were shown to operate on teeth or notches in the same control element, this is but a simple way of showing that these teeth move together, though each may be on a separate member attached together by a common shaft or otherwise positively connected for simultaneous movement.

I claim as my invention:

1. An electric selective code signal receiving device comprising, in combination, a control element movable in an advancing direction from a normal position; means responsive to an electric signal of the integer type for advancing said element step-by-step with the elements of said signal, the first step of said control element for any integer signal being of a length different from the lengths of subsequent steps for the same signal; and means responsive to the position of the control element for moving said control element toward said normal position upon reception of any signal other than said predetermined integer signal.

2. An electric selective code signal receiving device comprising, in combination, a control element movable in an advancing direction from a normal position; means responsive to a predetermined code in the form of a plurality of successive integer type signals for advancing said element step-by-step with the components of said integer signals, the first step of said control element for each integer signal being greater than the lengths of subsequent steps for the same signal; means limiting the advancing movement of said control element during the reception of each successive integer signal when any integer greater than one in accordance with said predetermined code is received; and means for moving said control element to said normal position at the completion of any integer signal whenever an integer signal other than one in accordance with said predetermined code is received.

3. An electric selective code signal receiving device comprising, in combination, a control element movable in an advancing direction toward an operating position from a normal position; means responsive to a predetermined coded electric signal containing at least two integer type signals for advancing said element step-by-step with the elements of said integer signals to said operating position, the first step of said control element for any integer signal being of a length different from the lengths of subsequent steps for the same integer signal; electric circuit control means operable only when said control element is in said operating position; and means dependent upon the length and number of steps associated with said integer signals for preventing operation of said electrical circuit control means when any electric signal other than said predetermined signal is received.

4. An electric selective code signal receiving device comprising, in combination, a control element movable in an advancing direction toward a predetermined operating position from a normal position; means responsive to an electric signal of the integer type for advancing said element step-by-step with the elements of said integer signal, the first step of said control element for any integer signal being of a length different from the lengths of the subsequent steps for the same integer signal; controlled means operable only at a predetermined time after the completion of an integer signal and only when the control element is at said predetermined operating position at said predetermined time; and means preventing the control element from being at said predetermined operating position at said predetermined time when any signal other than said predetermined signal is received.

5. An electric selective code signal receiving device comprising, in combination, a control element movable in an advancing direction toward a predetermined operating position from a normal position; means for advancing said control element step-by-step to and holding it at said predetermined operating position only in response to the reception of a predetermined electric code, said code comprising an electric current which is interrupted for short intervals in at least two groups of interruptions, the interruptions within each group being in rapid succession and recurring a number of times dependent upon the code, said steps of the control element being in step with said current interruptions and the first step of each group of steps associated with each signal being longer than the subsequent steps of the same signal; means dependent upon the lengths of said steps for preventing said control element from being advanced to and held at said operating position when any group of interruptions other than said predetermined code is received; and an electric switch having an operating element thereof carried by said control element and disposed to operate the switch when the control element is at said predetermined operating position.

6. An electric selective code signal receiving device comprising, in combination, a control element movable in an advancing direction toward a predetermined operating position from a normal position; means for advancing said control element step-by-step to and holding it at said predetermined operating position only in response to the reception of a predetermined electric code, said code comprising at least two groups of rapid successions of short current impulses of a number dependent upon the code, said steps of the control element being in step with said current impulses and the first step of each group of steps associated with each signal being longer than the subsequent steps of the same signal; means dependent upon the length of said steps for preventing said control element from being advanced to and held at said operating position when any group of impulses other than said predetermined code is received and an electric switch having an operating element thereof carried by said control element and disposed to operate the switch when the control element is at said predetermined operating position.

7. In a code selective device, the combination of a code plate having a series of notches; a reciprocable propelling pawl adapted to advance the code plate in steps by successively engaging said notches; and blocking means on the code plate and movable therewith for preventing said pawl from engaging said notches when the code plate has been advanced to a predetermined position.

8. The combination according to claim 7 wherein the blocking means is a deflector adjustably mounted on said code plate, whereby said predetermined position can be varied.

9. In a code selective device, the combination of a code plate having a series of notches; a reciprocable propelling pawl adapted to advance the code plate in steps by successively engaging said notches, the interval between said notches being aliquot parts of the lengths of said steps determined by the lengths of the respective propelling strokes of said pawl; means for reciprocating said propelling pawl in a series of strokes of different lengths in accordance with a predetermined code; and blocking means on the code plate for preventing said pawl from engaging said notches when the code plate is at a predetermined position at the beginning of a propelling stroke of the pawl.

10. In a code selective device, the combination of a code plate having a series of notches; a reciprocable propelling pawl adapted to advance the code plate in steps by successively engaging said notches, the interval between said notches being aliquot parts of the lengths of said steps determined by the lengths of the respective propelling strokes of said pawl; means for reciprocating said propelling pawl in a series of strokes of different lengths in accordance with a predetermined code; and a deflector on the code plate for preventing said pawl from engaging said notches when the code plate is at a predetermined position at the beginning of a propelling stroke of the pawl, the length of said deflector being such as to permit the pawl to engage a notch when the plate has been advanced beyond said predetermined position, whereby said code plate can be advanced beyond said predetermined position only when the propelling stroke of the pawl advancing the plate to said predetermined position is a long stroke of length sufficient to advance the plate beyond said predetermined position.

11. In an electric code selective receiving device adapted to be connected to an electric circuit, the combination of a code plate having a series of notches; a reciprocable propelling pawl adapted to advance the code plate in steps by successively engaging said notches, the interval between said notches being aliquot parts of the lengths of said steps determined by the lengths of the respective propelling strokes of said pawl; means responsive to an electric signal in said circuit in the form of successive integers for imparting to said pawl a succession of groups of propelling strokes, the number of strokes within each group being determined by the integer; means for controlling the lengths of said propelling strokes to cause the first stroke of each group to be of a length different from the length of the subsequent strokes of the same group; and blocking means for preventing said pawl from engaging said notches when the code plate is at a predetermined position at the beginning of a propelling stroke of the pawl, said blocking means permitting the pawl to engage a notch when the plate has been advanced beyond said predetermined position, whereby said code plate can be advanced beyond said predetermined position only when the propelling stroke of the pawl advancing the plate to said predetermined position is a long stroke of length sufficient to advance the plate beyond said predetermined position.

12. In an electric code selective receiving device adapted to be connected to an electric circuit, the combination of a toothed wheel mounted for rotation; means biasing said wheel toward a normal position; retaining pawl means for retaining the wheel in an advanced position; a reciprocable propelling pawl adapted to advance the wheel in steps by successively engaging the teeth of the wheel, the interval between said teeth being aliquot parts of the lengths of said steps determined by the lengths of the respective propelling strokes of said propelling pawl; means responsive to an electric signal in said circuit in the form of successive integers for imparting to said propelling pawl a succession of groups of propelling strokes, the number of strokes within each group corresponding to the integer;

means for controlling the lengths of said propelling strokes to cause the first stroke of each group to advance the wheel a distance equal to a plurality of teeth and the subsequent stroke of the same group to advance the wheel a shorter distance; and a deflector on the wheel having a deflecting surface disposed for engagement with said propelling pawl for preventing the propelling pawl from engaging said teeth when the deflector is opposite the propelling pawl at the beginning of a propelling stroke of the pawl and of a length to permit such engagement when the deflector is moved beyond said propelling pawl, whereby said wheel can be advanced beyond the position at which said deflector and propelling pawl are juxtaposed only by the first propelling stroke of each group of strokes.

13. In a code selective device, the combination of a code plate; means biasing said plate toward a normal position; retaining means cooperating with said plate and having a locking position for retaining the plate in any advanced position to which said plate is advanced by the propelling means hereinafter recited and an unlocked position permitting retrograde motion of the plate; propelling means for advancing said plate a variable distance from said normal position; means urging said retaining means toward its unlocked position; and means for holding said retaining means in its locking position effective only at a predetermined position of the plate.

14. The combination according to claim 13 wherein the retaining means is a pawl, and the means for holding the retaining means in locking position comprises a catch on the plate for engaging the pawl when the catch is in juxtaposition with the retaining pawl.

15. The combination according to claim 13 wherein the effective position of said means for holding the retaining means in locking position is adjustable, whereby the said predetermined position of the plate can be varied.

16. In an electric code selective receiving device adapted to be connected to an electric circuit, the combination of a code plate; means biasing said plate toward a normal position; a retaining pawl cooperating with said plate having a locking position for retaining the plate in an advanced position and an unlocked position permitting retrograde motion of the plate to said normal position; propelling means responsive to an electric signal in said circuit in the form of an integer for advancing said plate a variable distance from said normal position in accordance with the said integer; means urging said pawl toward its locking position during said electric integer signal; means urging said pawl toward its unlocked position upon the cessation of said electric integer signal; and means for holding said pawl in its locking position effective only at a predetermined position of the plate, whereby said plate will be retained at an advanced position only after said propelling means has advanced the plate to and not immediately beyond said predetermined position.

17. In an electric code selective receiving device adapted to be connected to an electric circuit, the combination of a toothed wheel mounted for rotation; means biasing said wheel toward a normal position; retaining means having a locking position for retaining the plate in an advanced position while permitting advancing rotation of the wheel and an unlocked position; a reciprocable propelled pawl adapted to advance said plate in steps by successively engaging the teeth of the wheel; electrically operated means responsive to a code in the form of successive electric integer signals in said circuit for imparting to said propelling pawl a succession of groups of propelling strokes with a time interval between groups, the number of strokes within each group corresponding to the respective integers; means urging said retaining means toward its locking position during an individual electric integer signal, and urging said retaining means toward its unlocked position at the cessation of each individual integer signal; and a plurality of caps on said wheel and spaced circumferentially thereon having catches for holding said retaining means in its locking position only when the catch is opposite the retaining means, whereby said wheel will be retained in successive advanced positions only after a predetermined sequence of integer signals has been transmitted on said electric circuit.

18. In a code selective device, the combination of a code plate; means biasing said plate toward a normal position; a reciprocable propelling pawl adapted to advance said plate in steps from said normal position by successively drivingly engaging said plate, the lengths of said steps being determined by the lengths of the respective propelling strokes of said propelling pawl; means for reciprocating said propelling pawl in a series of propelling strokes of different lengths; blocking means for preventing the propelling pawl from drivingly engaging said plate when the code plate is in a first predetermined position, whereby the plate can be advanced beyond said first predetermined position only by a long propelling stroke moving the plate continuously to and beyond said first predetermined position; retaining means biased to retain said plate in successive advanced positions only during the reciprocation of said propelling pawl; and means for retaining said plate in an advanced position only when the plate has been advanced to a second predetermined position other than said first predetermined position, whereby the plate will be retained at an advanced position after cessation of said series of propelling strokes after the plate has been advanced to and not immediately beyond said second predetermined position.

19. The combination according to claim 18 wherein the blocking means comprises a deflector on a cap carried by the code plate having a deflecting surface disposed for engagement with the propelling pawl when opposite thereto, and the means for retaining the plate in an advanced position comprises a catch on said code plate disposed to hold said retaining means in retaining position when the said deflecting surface is in a position short of being opposite to the propelling pawl, whereby said first predetermined position is in advance of said second predetermined position.

20. In an electric code selective receiving device adapted to be connected to an electric circuit, the combination of a code plate; means biasing said plate toward a normal position; a reciprocable propelling pawl adapted to advance said plate in steps from said normal position by successively drivingly engaging said plate, the lengths of said steps being determined by the lengths of the respective propelling strokes of said propelling pawl; electrically operated means responsive to an electric signal in said circuit in the form of successive integers for imparting to said propelling pawl a succession of groups of propelling strokes with a time interval between groups, the number of strokes within each group being determined by the respective integer and the first propelling stroke of each group being longer than the subsequent propelling strokes; a plurality of spaced deflectors on said plate for preventing driving engagement of the propelling pawl with the plate when the plate is in any one of a series of first predetermined positions with the deflectors in alignment with the propelling pawl, whereby the plate can be advanced beyond said first predetermined positions only by long propelling strokes moving the plate continuously to and beyond said first predetermined positions; a retaining pawl having a locking position for retaining said plate in an advanced position and an unlocked position for permitting retrograde motion of the plate to said normal position; means biasing said retaining pawl toward said locking position during the individual electric integer signal and urging said retaining pawl toward its unlocked position at the cessation of each individual integer signal; and a plurality of spaced catches on said plate for holding said retaining pawl in its locking position only when the plate has been advanced to one of several second predetermined positions near to and short of corresponding first predetermined positions, whereby the plate will be returned at an advanced position after the cessation of any individual integer signal when the plate has been advanced to and not immediately beyond one of said second predetermined positions.

21. In an electric code selective receiving device adapted to be connected to an electric circuit through which electric code signals in the form of successive integers are transmitted, the combination of a fast-acting armature and a slow-acting armature, both armatures being actuated by electro-magnetic means connected to said circuit; a code plate; means biasing said plate toward a normal position; reciprocable propelling means actuated by said fast-acting armature and adapted to advance the code plate in steps by successive reciprocations; and means responsive to the position of the slow-acting armature and to the position of the plate for retaining the plate in an advanced position during the transmission of an electric integer signal and thereafter only when the plate has been advanced to and not immediately beyond a predetermined advanced position.

22. The combination according to claim 21 wherein the means for retaining the plate in an advanced position comprises: a retaining pawl having a locking position for retaining said plate in an advanced position and an unlocked position permitting retrograde motion of the plate; resilient means actuated by said second armature for urging the retaining pawl to its locking position during the transmission of an electric integer signal and for urging the retaining pawl to its unlocked position between successive integer signals; and a catch on said plate for holding the pawl in its locking position when said plate is at a predetermined advanced position.

23. In an electric code selective receiving device adapted to be connected to an electric circuit through which electric signals in the form of successive integers are transmitted, each integer signal comprising a sequence of closely spaced changes of electric potential the number of which changes is dependent upon the integer, the combination of a fast-acting armature and a slow-acting armature, both armatures being actuated by electro-magnetic means connected to said circuit, the fast-acting armature being adapted to reciprocate in step with each change of potential within an integer signal and the slow-acting armature being adapted to assume a first position throughout the transmission of an integer signal and a second position between successive integer signals; a code plate having notches thereon; means biasing said plate toward a normal position; a reciprocable propelling pawl actuated by said fast-acting armature and adapted to advance the plate in steps by successively engaging said notches; a retaining means having a locking position for retaining said plate in an advanced position and an unlocked position permitting retrograde motion of the plate; means connected to said slow-acting armature for urging the retaining means to its locking position when the armature is in its first position and urging the retaining means to its unlocked position when the armature is in its second position; and means for holding said retaining means in its locking position only when the plate is in a predetermined, advanced position, whereby the plate will remain in an advanced position following the completion of an integer signal only after said plate has been advanced to and not immediately beyond said predetermined position.

24. In an electric code selective receiving device adapted to be connected to an electric closed type signal circuit through which electric code signals in the form of successive integers are transmitted, each integer signal comprising a sequence of closely spaced interruptions in an electric potential, the number of interruptions within each signal being dependent upon the integer, the combination of a fast-acting armature and a slow-operating armature, both armatures being actuated by electro-magnetic means connected to said circuit, the fast-acting armature being adapted to reciprocate in step with each interruption and the slow-operating armature being adapted to assume a released position throughout the transmission of an integer signal and to assume an attracted position between successive integer signals; a code plate; means biasing said plate toward a normal position; a reciprocable propelling pawl actuated by said fast-acting armature and adapted to advance the code plate in steps by successively drivingly engaging said plate; and means responsive to the position of the slow-operating armature and to the position of the plate for retaining the plate in an advanced position when the slow-operating armature is in its released position and thereafter only when the plate has been advanced to and not immediately beyond a predetermined advanced position.

25. In an electric code selective receiving device adapted to be connected to an electric open type signal circuit through which electric code signals in the form of successive integers are transmitted, each integer signal comprising a sequence of closely spaced electric impulses, the number of impulses within each signal being dependent upon the integer, the combination of a fast-acting armature and a slow-release armature, both armatures being actuated by electromagnetic means connected to said circuit, the fast-acting armature being adapted to reciprocate in step with each electric impulse and the slow-release armature being adapted to assume an attracted position throughout the transmission of an electric integer signal and to assume a released position between successive integer signals; a code plate; means biasing said plate toward a normal position; a reciprocable propelling pawl actuated by said fast-acting armature adapted to advance the code plate in steps by successively drivingly engaging said plate; and means responsive to the position of the slow-release armature and to the position of the plate for retaining the plate in an advanced position when the slow-release armature is in its attracted position and thereafter only when the plate has been advanced to and not immediately beyond a predetermined advanced position.

26. In an electric code selective receiving device adapted to be connected to an electric circuit through which electric code signals in the form of successive integers are transmitted, the combination of a fast-acting armature and a slow-acting armature, both armatures being actuated by electro-magnetic means connected to said circuit; a code plate; reciprocable propelling means actuated by said fast-acting armature and adapted to advance the code plate in steps by successive reciprocations, the lengths of said steps being determined by the lengths of the respective propelling strokes; means controlled by said slow-acting armature for controlling the lengths of said propelling stroke; and means for rendering said propelling means inoperative to advance the code plate when the code plate is at a predetermined position at the beginning of a propelling stroke, whereby said code plate can be advanced beyond said predetermined position only when the propelling stroke advancing the plate to said predetermined position is a long stroke of length sufficient to advance the plate beyond said predetermined position.

27. In an electric code selective receiving device adapted to be connected to an electric circuit through which electric code signals in the form of successive integers are transmitted, the combination of a fast-acting armature and a slow-acting armature, both armatures being actuated by electro-magnetic means connected to said circuit; a code plate having a series of evenly spaced notches; a reciprocable propelling pawl actuated by said fast-acting armature and adapted to advance said plate in steps by successively engaging said notches, the interval between said notches being aliquot parts of the lengths of said steps determined by the lengths of the respective propelling strokes of said pawl; means controlled by said slow-acting armature for limiting the lengths of the propelling strokes of the pawl subsequent to the first stroke within each integer signal while permitting the first stroke within each integer signal to be longer; and blocking means for preventing the propelling pawl from drivingly engaging said notches when the code plate is at a predetermined position at the beginning of a propelling stroke, whereby said plate can be advanced beyond said predetermined position only when the propelling stroke advancing the plate to said predetermined position is a long stroke of length sufficient to advance the plate beyond said predetermined position.

28. The combination according to claim 27 wherein the means for limiting the lengths of the propelling strokes of the pawl comprises a movable stop having an inoperative position and an operative position for limiting the propelling stroke of the pawl; means actuated by said slow-acting armature urging said stop to its inoperative position in the time interval between the transmission of successive integer signals; means actuated by said slow-acting armature urging said stop to its operative position during the transmission of an integer signal; and engaging means operated by said fast-acting armature for engaging said stop and thereby interrupting the movement thereof to said operative position during the said first stroke of the propelling pawl and permitting the stop to move to said operative position after the completion of said first stroke.

29. The combination according to claim 28 wherein the movable stop is pivotally supported, is provided with resilient means urged by said slow-acting armature to said operative position, and has an engaging finger; and the engaging means operated by the fast-acting armature comprises a reciprocable abutment actuated by said fast-acting armature to engage said engaging finger in one position of the abutment for preventing movement of the stop to its operative position and retractible away from said engaging finger.

30. In an electric code selective receiving device adapted to be connected to an electric circuit through which electric code signals in the form of successive integers are transmitted, each integer signal comprising a sequence of closely spaced changes of electric potential the number of which changes is dependent upon the integer, the combination of a fast-acting armature and a slow-acting armature, both armatures being actuated by electro-magnetic means connected to said circuit, the fast-acting armature being adapted to reciprocate in step with each change of potential within an integer signal and the slow-acting armature being adapted to assume a first position throughout the transmission of an integer and a second position between successive integer signals; a toothed code wheel mounted for rotation; means biasing said wheel toward a normal position; a reciprocable propelling pawl actuated by said fast-acting armature and adapted to advance said plate in steps from said normal position by successively engaging the teeth of the wheel, the interval between said teeth being aliquot parts of the lengths of said steps determined by the lengths of the respective propelling strokes of said propelling pawl; a plurality of caps spaced circumferentially about said wheel, each cap having a deflecting surface for preventing engagement of the propelling pawl with the teeth when the wheel is in any of a first group of predetermined positions whereat said surface is opposite the driving pawl at the beginning of a propelling stroke, whereby the wheel can be advanced beyond said first predetermined positions only by long propelling strokes moving the wheel continuously to and beyond said first predetermined positions; means for controlling the lengths of said propelling strokes comprising a movable stop having an inoperative position and an operative position for limiting the propelling stroke of the propelling pawl and an engaging finger; resilient means actuated by said slow-acting armature for urging said stop to inoperative position when the slow-acting armature is in said second position and urging said stop to operative position when the armature is in said first position; a reciprocable abutment actuated by said fast-acting armature for engaging said engaging finger and thereby preventing movement of said stop to operative position in one position of the abutment and retractible away from said engaging finger, the speed of movement of said engaging finger being slower than that of the abutment, whereby the stop is prevented from moving to the operative position during the first propelling stroke of the propelling pawl of an integer signal, but is free to move to said operative position immediately subsequent to said first stroke, whereby the length of the first propelling stroke of each integer signal will be longer than subsequent strokes in the same integer signal; a retaining pawl having a locking position in engagement with said teeth for retaining said wheel in an advanced position while permitting further advance motion and an unlocked position clear of said teeth; means urging said retaining pawl to said locking position when the slow-acting armature is in said first position and urging said retaining pawl to said unlocked position when the armature is in said second position; and a catch on each of said caps for engaging and holding said retaining pawl in its locking position only when the wheel has been advanced to one of several second predetermined positions, whereby the wheel will be retained at an advanced position after the cessation of any individual digit signal only when the wheel has been advanced to and not immediately beyond one of said second predetermined positions.

31. In an electric code selective receiving device adapted to be connected to an electric circuit through which electric signals in the form of integers are transmitted, the combination of a fast-acting armature and a slow-acting armature, both armatures being actuated by electro-magnetic means connected to said circuit; a code plate; reciprocable propelling means actuated by said fast-acting armature and adapted to advance the code plate in steps by successive reciprocations; and electrical circuit control means actuated by said slow-acting armature upon the completion of the transmission of an electrical digit signal and cooperating with said code plate so as to be operated in accordance with the position of said plate upon completion of said integer signal.

32. In an electric code selective receiving device adapted to be connected to an electric circuit through which electric signals in the form of integers are transmitted, the combination of a fast-acting armature and a slow-acting armature, both armatures being actuated by electro-magnetic means connected to said circuit; a code plate; means biasing said plate toward a normal position; retaining means for retaining the plate in an advanced position; reciprocable propelling means actuated by said fast-acting armature and adapted to advance the code plate in steps by successive reciprocations; means actuated by said slow-acting armature and by the position of the plate at the completion of an integer signal for operating the retaining pawl for maintaining the plate in advanced position only following the transmission of a predetermined integer signal; and electrical circuit control means actuated by said slow-acting armature upon the completion of the transmission of an electrical integer signal and cooperating with said code plate so as to be operated in accordance with the position of said plate upon the completion of said digit signal.

33. The combination according to claim 32 wherein the circuit control means comprises a first electric contact on the code plate and movable therewith along a path; a second movable electric contact cooperating with said first contact and actuated by said slow-acting armature to occupy a position away from said path of the first contact during the transmission of an electric integer signal and to move into said path for engagement with the first contact upon the completion of said signal, whereby the said electrical contacts will come into engagement only when the plate is retained in a predetermined advanced position subsequent to the completion of said digit signal.

HAROLD ADOLPH STICKEL.

REFERENCES CITED

The following references are of record in the file of this patent:

UNITED STATES PATENTS

| Number | Name | Date |
|---|---|---|
| 1,343,256 | Field | June 15, 1920 |
| 2,039,966 | Lockhart et al. | May 5, 1936 |
| 2,250,856 | Burton | July 29, 1941 |
| 2,359,494 | Stickel | Oct. 3, 1944 |
| 2,391,479 | Rivers | Dec. 25, 1945 |